United States Patent
Klemm et al.

(10) Patent No.: US 10,728,359 B2
(45) Date of Patent: Jul. 28, 2020

(54) SYSTEM AND METHOD FOR DETECTING AND ANALYZING USER MIGRATION IN PUBLIC SOCIAL NETWORKS

(71) Applicant: Avaya Inc., Basking Ridge, NJ (US)

(72) Inventors: Reinhard P. Klemm, Basking Ridge, NJ (US); Doree Duncan Seligmann, New York, NY (US)

(73) Assignee: Avaya Inc., Santa Clara, CA (US)

( * ) Notice: Subject to any disclaimer, the term of this patent is extended or adjusted under 35 U.S.C. 154(b) by 854 days.

(21) Appl. No.: 13/928,532

(22) Filed: Jun. 27, 2013

(65) Prior Publication Data
US 2014/0250182 A1 Sep. 4, 2014

Related U.S. Application Data

(60) Provisional application No. 61/771,236, filed on Mar. 1, 2013.

(51) Int. Cl.
*H04L 29/08* (2006.01)
*H04W 4/21* (2018.01)

(52) U.S. Cl.
CPC ............ *H04L 67/306* (2013.01); *H04W 4/21* (2018.02)

(58) Field of Classification Search
CPC ...... H04W 4/206; H04W 4/21; H04L 67/306; H04L 29/08
USPC .......................................................... 709/224
See application file for complete search history.

(56) References Cited

U.S. PATENT DOCUMENTS

| | | | | |
|---|---|---|---|---|
| 7,069,308 B2 * | 6/2006 | Abrams | ......................... | 709/218 |
| 7,346,751 B2 * | 3/2008 | Prahlad et al. | ................ | 711/162 |
| 2008/0004035 A1 * | 1/2008 | Atkins et al. | ................. | 455/454 |
| 2008/0104495 A1 * | 5/2008 | Craig | ............................ | 715/205 |
| 2009/0164395 A1 * | 6/2009 | Heck | ................. | G06F 17/30873 706/16 |
| 2010/0162359 A1 * | 6/2010 | Casey et al. | ....................... | 726/3 |
| 2011/0314142 A1 * | 12/2011 | Newton | ............ | G06Q 30/0201 709/224 |
| 2012/0047219 A1 * | 2/2012 | Feng et al. | ..................... | 709/207 |
| 2012/0290950 A1 * | 11/2012 | Rapaport et al. | ............. | 715/753 |
| 2013/0132484 A1 * | 5/2013 | Berezecki | ..................... | 709/205 |

OTHER PUBLICATIONS

Reinhard P. Klemm and Doree Duncan Seligmann; Related U.S. Appl. No. 16/898,572 entitled "System and Method for Detecting and Analyzing User Migration in Public Social Networks"; filed with the United States Patent and Trademark Office on Jun. 11, 2020.

* cited by examiner

*Primary Examiner* — Brian Whipple
*Assistant Examiner* — John Fan
(74) *Attorney, Agent, or Firm* — Stevens & Showalter LLP

(57) ABSTRACT

An event selection system for computing user migration pattern across social network pages is provided. The event selection system includes a monitor module to monitor predetermined activities of social media users on preconfigured resources. The event selection system further includes a profile module to build a social media user profile based on the monitored activities of the social media users. The event selection system further includes a computing module to compute user migration patterns based on the social media user profiles. The event selection system further includes a display module to display the user migration patterns on a system user terminal. The event selection system further includes a reporting module configured to produce a report based on the monitored social media user activities.

19 Claims, 5 Drawing Sheets

SYSTEM AND METHOD FOR DETECTING AND ANALYZING USER MIGRATION IN PUBLIC SOCIAL NETWORKS

CROSS-REFERENCE TO RELATED APPLICATIONS

This application claims the benefit of U.S. Provisional Application Ser. No. 61/771,236 filed Mar. 1, 2013, entitled "SYSTEM AND METHOD FOR DETECTING AND ANALYZING USER MIGRATION IN PUBLIC SOCIAL NETWORKS," which is incorporated herein by reference in its entirety.

BACKGROUND

1. Field of the Invention

Embodiments of the present invention generally relate to tracking usage of social networks and particularly to a system and method for analyzing sequences of actions by a social media user when visiting a social networking site.

2. Description of Related Art

Companies have always been concerned about contents published on their websites. Companies provide sticky contents such as, chat rooms, web mails, Internet games, weather, news, blogs etc. on their websites, for the purpose of getting Web surfers to return to their websites, or to hold the attention of the Web surfers and get them to spend longer period of time on their websites. Further, sticky content published on the website results in exposure of the Web surfers to a company's overt or subtle messages, increased sales of products and services on the website and a decrease in time that a Web surfer spends on the web pages of competitors of the company. With the increased use of social networking sites such as Facebook, companies have become more concerned about the stickiness of their social web pages as well.

Traditionally, companies and organizations with web pages determine the stickiness of their web pages by measuring the time that a Web surfer spends on the web page, and in which interval he or she returns to that page. A company or an organization would also greatly benefit from information about web surfing habits of their web page visitors when these visitors are not on the company's or organization's web page. For example, a company may be interested in understanding how much time a Web surfer spends on a competitor's web page, or what makes the Web surfer migrate from the company's web page to the competitor's web page. Further, other important questions may include which competitor does the Web surfer go to most of the time when defecting from the company's web page, and which one the least, who is really the online competition, and what exactly does the Web surfer do on competitors' pages, where, when, and how often, and where do new Web surfers come from mostly, i.e., come from as in whose pages do they come from, to the company's page. This type of information is generally unavailable to a company. However, a company or organization with a presence on a public social network, for example, a Facebook page, is likely interested in analogous questions and such information can be gleaned from the public social network. Here, the company may be interested in the visitors of its Facebook page and the visitors' activities on the Facebook pages of the company's competition or of companies with complementary products and services.

There is thus a need for a system and method to provide more detailed information about the sequence of actions and activities of social network users when visiting a social networking site, in order to improve customer retention, prevent customer defection, and ultimately provide improved customer satisfaction. Public social networks typically provide access to activities on the social network through an application programming interface (API), and thus allow third parties insights into some of the social network activities of its social media users. The data retrieved from such an API can serve as the basis for answering the above questions that a company is interested in.

SUMMARY

Embodiments in accordance with the present invention provide an event selection system for computing user migration pattern on pages of a social network. The event selection system includes a monitor module to monitor predetermined activities of a social media user on preconfigured resources. The event selection system further includes a profile module to build social media user profiles for each user based on the monitored activities of the social media user. The event selection system further includes a computing module to compute user migration patterns based on the social media user profiles. The event selection system further includes a display module to display the user migration patterns. The event selection system further includes a reporting module configured to produce report based on the monitored social media user activities. The event selection system further includes a query module to receive a query from a user and provide results corresponding to the query.

Embodiments in accordance with the present invention further provide a computer-implemented method for computing user migration pattern on pages of a social network. The computer-implemented method includes monitoring predetermined activities of a social media user on preconfigured resources, building a social media user profile based on the monitored activities of the social media user, analyzing and computing social media user migration patterns based on the social media user profiles, and reporting monitored activities of the social media user to a system user.

Embodiments in accordance with the present invention further provide a computer readable medium storing computer readable instructions when executed by a processor performs a method. The method includes monitoring predetermined activities of a social media user on preconfigured resources, building a social media user profile based on the monitored activities of the social media user, analyzing and computing social media user migration patterns based on the social media user profiles, and reporting monitored activities of the social media user to a system user.

The present invention can provide a number of advantages depending on its particular configuration. First, the present invention monitors social media users' behavior across different social media channels such as a Twitter feed, a Facebook page, a YouTube channel etc. For example, a company may want to measure itself against a competitor in some way, or monitor whether social media users jump back and forth between the company pages and the competitor's pages. The present invention enables the company or enterprise to monitor a set of pages of a social media channel to determine social media user's activities that varies from one social media page (e.g., company Facebook page) to another social media page (e.g., competitors' Facebook page) of the social media channel.

In addition, the present invention provides ability to generate different views of user migration patterns for different users such as an enterprise, consumers, and members/non-members of the social media channels. For example, an enterprise determines how often the social media users migrate from the company pages to competitors' pages or from the competitors' pages to the company pages and then take corrective measures based on the user migration patterns. Further, the migration patterns may provide an opportunity to the company to increase sales, marketing, or to represent business on the social media channels according to the user migration patterns. Furthermore, this may facilitate analysis of the user migration patterns and tuning of marketing strategies by the companies.

Further, the present invention maintains an activity list, each activity list being a representation of activities and interactions of a social media user on any of the monitored pages in a Page mix during a configured time interval. Further, the present invention analyzes the activity list and patterns of a social media user's migration across the monitored pages used by the new, social contact centers for the purpose of sales, marketing, or representing a business on the social network sites.

These and other advantages will be apparent from the disclosure of the present invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
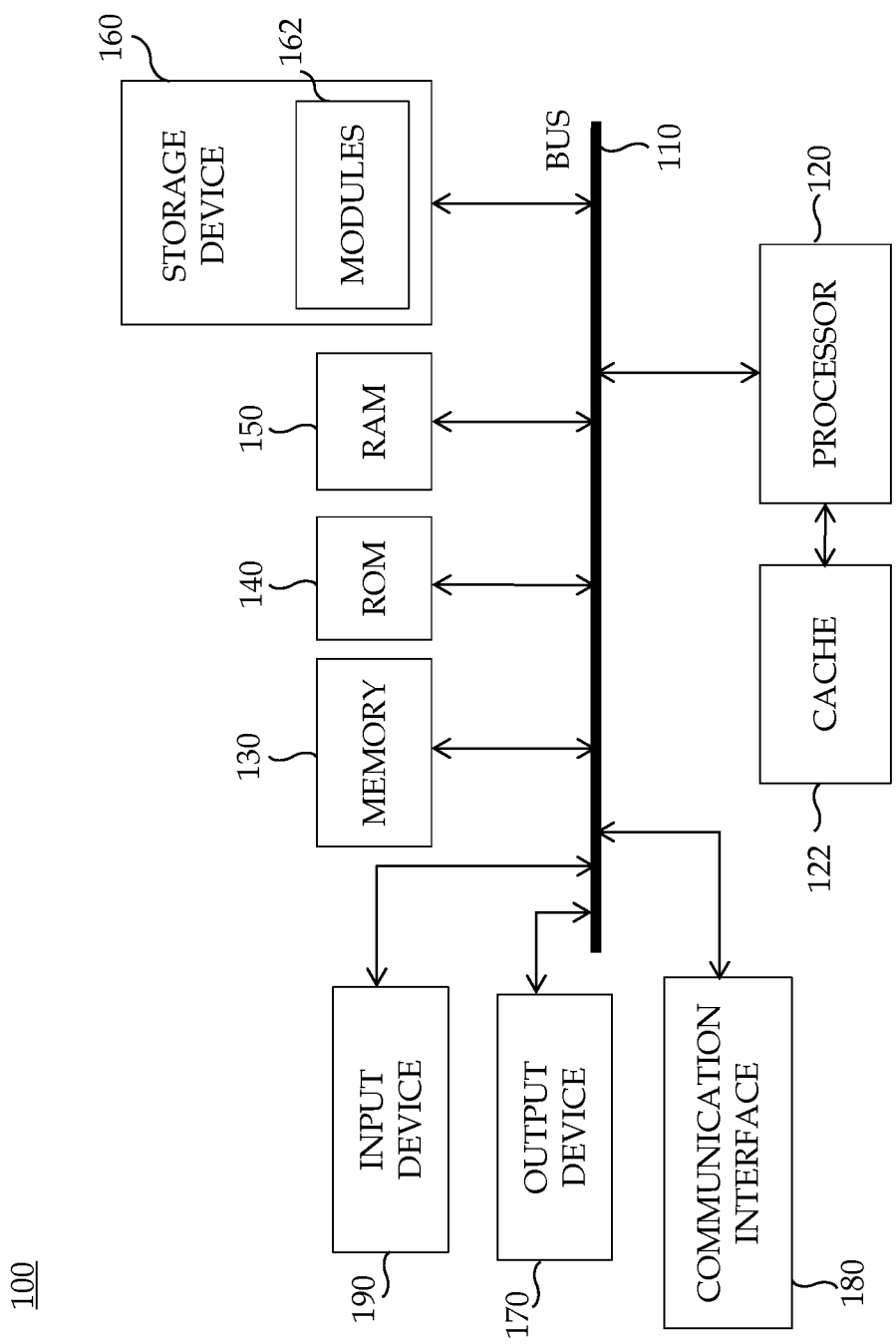
FIG. 1 illustrates an example system embodiment of the present invention.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The present invention will be illustrated below in conjunction with an exemplary communication system. Although well suited for use with, e.g., a system using a server(s) and/or databases(s), the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include an enterprise switch, or other type of communications system switch or server, as well as other types of processor-based communication control devices such as media servers, computers, adjuncts, etc.

With reference to FIG. 1, an exemplary system includes a general-purpose computing device 100, including a system bus 110 and a processing unit (CPU or processor) 120 that couples various system components including the system memory 130 such as read only memory (ROM) 140 and random access memory (RAM) 150 to the processor 120. The system may include a cache 122 of high speed memory connected directly with, in close proximity to, or integrated as part of the processor 120. The system copies data from the system memory 130 and/or the storage device 160 to the cache 122 for quick access by the processor 120. In this way, the cache 122 provides a performance boost that avoids the processor 120 delays while waiting for data. These and other modules may control or be configured to control the processor 120 to perform various actions. Other system memory 130 may be available for use as well. The system memory 130 may include multiple different types of memory with different performance characteristics. It may be appreciated that the disclosure may operate on a computing device 100 with more than one processor 120 or on a group or cluster of computing devices networked together to provide greater processing capability. The processor 120 may include any general purpose processor and a hardware module or software module 162 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in read only memory (ROM) 140 or the like, may provide the basic routine that helps to transfer information between elements within the computing device 100, such as during start-up. The computing device 100 further includes storage device 160 such as a hard disk drive, a magnetic disk drive, an optical disk drive, tape drive or the like. The storage device 160 may include software module 162 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one embodiment of the present invention, a hardware module that performs a particular function includes the software component stored in a computer-readable medium in connection with the necessary hardware components, such as the processor 120, bus 110, output device 170, and so forth, to carry out the function. The basic components are known to those of skill in the art and appropriate variations are contemplated depending on the type of device, such as whether the computing device 100 is a small, handheld computing device, i.e., a smart phone, a desktop computer, or a computer server.

Although the exemplary embodiment described herein employs the hard disk 160, it should be appreciated by those skilled in the art that other types of computer readable media which may store data that are accessible by a computer, such as magnetic cassettes, flash memory cards, digital versatile disks, cartridges, read only memory (ROM) 140, random access memories (RAMs) 150, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 180 represents any number of input mechanisms, such as a microphone for speech, a touch-sensitive screen for gesture or graphical input, keyboard, mouse, motion input, speech and so forth. An output device 170 may also be one or more of a number of output mechanisms known to those of skill in the art. In some instances, multimodal systems enable a user to provide multiple types of input to communicate with the computing device 100. Communication interface 190 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. Further, use of the term "processor" should not be construed to refer exclusively to hardware capable of executing software. Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 may practice all or part of the recited methods, may be a part of the recited systems, and/or may operate according to instructions in the recited non-transitory computer-readable storage media. Such logical operations may be implemented as modules configured to control the processor 120 to perform particular functions according to the programming of the module. For example, FIG. 1 illustrates the software module 162 in the storage device 160 configured to control the processor 120. These modules may be stored on the storage device 160 and loaded into random access memory (RAM) 150 or system memory 130 at runtime or may be stored as would be known in the art in other computer-readable memory locations.

Figure 2:
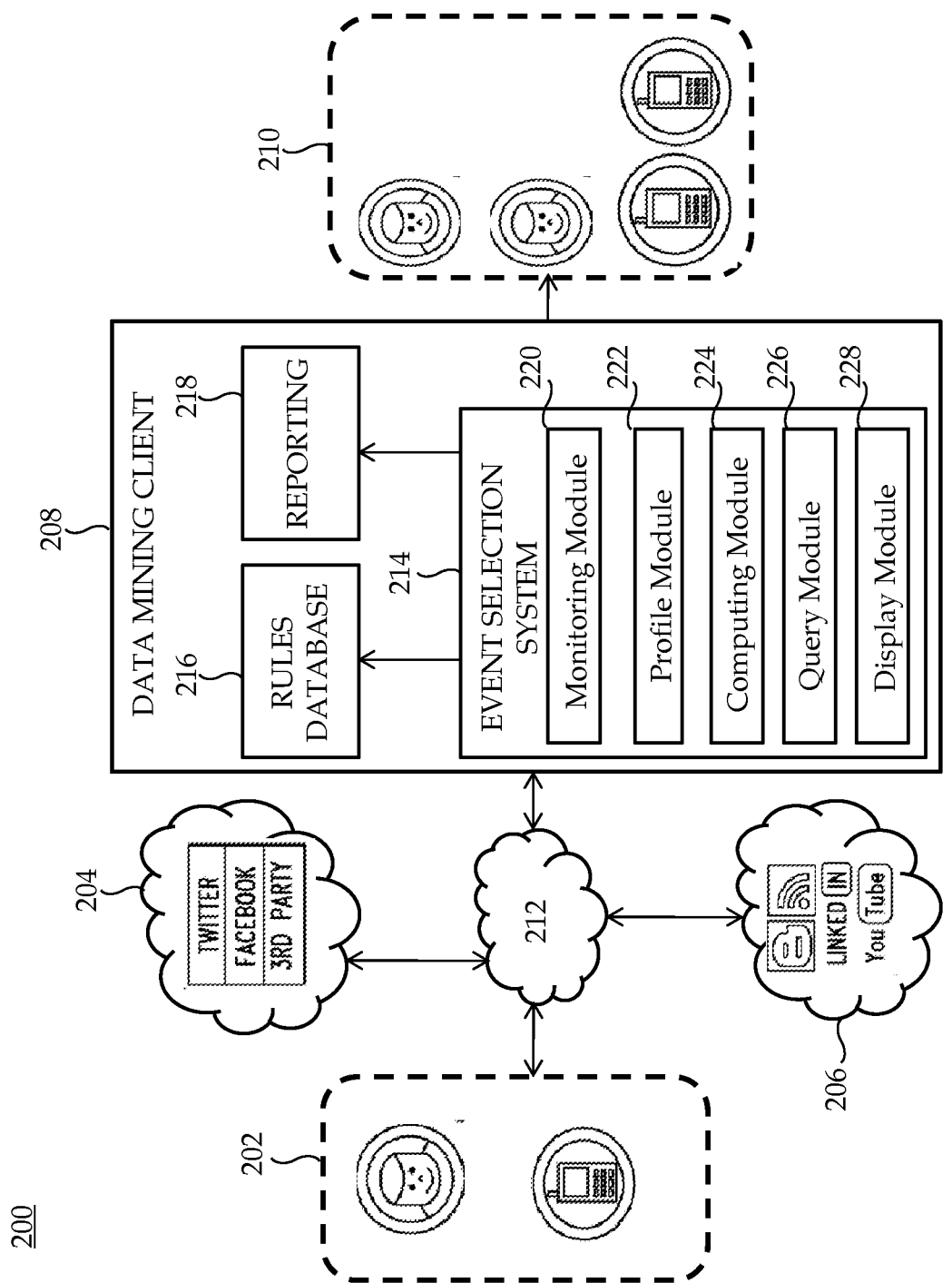
FIG. 2 illustrates an exemplary architecture in which various embodiments may be implemented.

Having disclosed some components of a computing system, the disclosure now turns to FIG. 2, which illustrates a network environment 200 in which the various embodiments of the present invention may be implemented. As shown in FIG. 2, the network environment 200 includes social media user terminal 202 associated with social media user, direct social media channel 204 (with respect to the data mining client 208), indirect social media channels 206 (with respect to the data mining client 208), a data mining client 208, and a system user terminal 210. The elements 202-208 may be connected via at least one network 212.

The network environment 200 includes a social media user terminal 202 connected to a data mining client 208 via network 212. According to an embodiment of the present invention, the social media user terminal 202 may include a computing device 100 of the social media user, for example, a smart phone, a laptop, a desktop, a tablet etc. The network 212 may include, but is not restricted to, a communication network such as the Internet, PSTN, Local Area Network (LAN), Wide Area Network (WAN), Metropolitan Area Network (MAN), and so forth. In an embodiment of the present invention, the network 212 may be a data network such as the Internet.

In the various embodiments of the present invention, the data mining client 208 may be configured to support a variety of communication modes. For example, the data mining client 208 may be configured to support a client-server communication mode with one or more of direct social media channels 204. That is, data mining client 208 may initiate a request for information by way of a standardized message such as, a message in accordance with an API interface understood by direct social media channel 204 for example, Facebook. Direct social media channel 204 will act as a server and deliver the requested information to the data mining client 208. However, the various embodiments are not limited in this regard and any other type of communication mode may also be used.

The social media user terminal 202 may be configured to support the communication modes described above using a wide variety of devices, including devices operating over analog or digital communication channels designed for the delivery of information to users in an audio form, a visual form (including static and dynamic visual elements), or any combination thereof. For example, in some embodiments of the present invention, social media user terminal 202 may include a general purpose computer device connected to the data network 212, as described above with respect to FIG. 1. Such devices may include a desktop computer, portable computer, personal digital assistant, smart phone, or any other type of appliance or device having access to one or more data networks supporting real-time and/or time-shifted communication modes over such networks. However, the various embodiments are not limited in this regard. For example, the social media user terminal 202 may be devices supporting communications over telephony networks or any other type of communication networks. Such devices may include land-line telephone devices, mobile or cellular telephone devices, videophone devices, and the like. However, the various embodiments are not limited in this regard and any other types of devices may be used for social media user terminal 202.

Further, in another embodiment of the present invention, the social media user terminal 202 may communicate in various ways. In one embodiment of the present invention, a social media user makes use of a social media user terminal 202 to establish a communication session with a social media channel 204 and/or 206. For example, a customer may establish a telephony communication link with a website hosting a social media channel 204. In another embodiment of the present invention, the customer may establish a communication session over a videophone, instant messaging, or other real-time communications means.

As shown in FIG. 2, social media channel 204 and 206 are accessible through the network 212 and may include direct and indirect social media channels, respectively, with respect to the data mining client 208. As used herein, a direct social media channel refers to a social media channel that provides an API middleware interface that is accessible by the data mining client 208. For example, social media channel 204 may include Facebook. Indirect social media channels 206 may include media channels that do not provide an API middleware interface that is accessible by the data mining client 208.

Further, according to an embodiment of the present invention, the data mining client 208 includes an event selection system 214, a rules database 216, and a reporting module 218. The event selection system 214 includes a monitoring module 220, a profile module 222, a computing module 224, a query module 226, and a display module 228.

The monitoring module 220 is configured to enable system users to identify pages that they want to have tracked by the event selection system 214. For example, a company having a page on Facebook may identify its own Facebook page, plus the Facebook pages of certain competitors. In an embodiment of the present invention, the monitoring module 220 may allow system users to identify certain Facebook pages and then track social media users that visit those Facebook pages. The tracking may include observing how the social media users interact with each identified Facebook page, how they cross over from page-to-page, and so forth.

In an embodiment of the present invention, the monitoring module 220 is configured to monitor predetermined activities of social media users on preconfigured resources. The preconfigured resources include a set of pages on a social networking site. In an embodiment of the present invention, the monitoring module 220 is configured to continuously monitor for predetermined activities that the social media user conducts while visiting a social networking site, in particular one or more predetermined business or personal Facebook pages, which may be grouped into a configurable set of Facebook pages ("Page mix"). Predetermined activities may include posting of messages (i.e., posts), comments (e.g., responses to other posts), likes or dislikes, posting or viewing of photos, tags (i.e., identification of a person in a photo), and substantially any other publicly visible user and/or page-owner expressions.

The Page mix may contain a link to the social media or social media channels of a business's known competitors' pages, and a link to Facebook pages of other businesses (e.g., competitors, suppliers, customers, peers, etc.). An activity recorder records new activities and adds the new activities to a repository of activities that may be searched by either Page ID or activity owner ID.

In another embodiment of the present invention, the monitoring module 220 may determine a dynamic Page mix under the direction of the system user. A dynamic Page mix may include additional pages that social media user who have been active on an initially determined static core Page mix may have also been active on. For example, if a system user represents company 'A', the core Page mix may include all of A's Facebook pages. For each social media user who has been active on these pages, the event selection system would determine and track which other page(s) the social media user interacted with and add those pages to the Page mix.

Further, the monitoring module 220 may monitor social media users' behavior across different pages of the social networking site (e.g., Facebook), with pages to monitor being identified in advance to monitor temporal closeness of social media users' actions. The temporal closeness of social media users' actions may indicate that actions that take place close in time are more significant for the system user than if they take place farther apart in time. For example, public Facebook pages identified for monitoring are linked in some sense, for example, pages for Company 'X' that has competition 'Y' and 'Z', or a set of different Facebook pages each tailored to a different demographic, different geography, or the like. Further, suppose an owner of the pages wants to track how a social media user behaves across these public Facebook pages such as a company may want to measure itself against a competitor in some way, or monitor how often social media user jumps back and forth between the company pages and the competitor's pages.

Further, the monitoring module 220 is configured to monitor temporal aspects of the social media users' viewing across the monitored pages. In an embodiment of the present invention, temporal aspects of the social media users' may be monitored by way of a relative time stamp. The relative time stamp indicates the elapsed time between observable events on monitored social media channels. The observable events may include posting a comment, replying to a comment, tagging, liking, disliking, etc.

Furthermore, the monitoring module 220 is configured to mine social media user related data from the preconfigured resources of the social media channel. In an embodiment, the monitoring module 220 may utilize social media observable events. In an embodiment of the present invention, a primary source for collecting the social media data may be via application programming interface (API) functions available from social media channel 204 such as in Facebook.

In another embodiment of the present invention, a secondary source of social media related data is utilized, i.e., indirect social media channels 206. In particular, the data mining client 208 is configured to access and monitor indirect social media channels 206 for social media user related data. As a result, the social media user related data so collected may add additional aspects of the social media user's interest. Thus, the composite social media related data may more accurately reflect the overall characteristics of the social media user and allows the data mining client 208 to provide a more customized view of the social media user's interaction with social media.

Further, in another embodiment of the present invention, the monitoring module 220 is configured to retrieve social media user observable events. According to an embodiment of the present invention, the monitoring module 220 relies on API functions publicly available from the direct social media channels 204 (e.g., Facebook). The monitoring module 220 is also configured to retrieve information from indirect social media channels 206. According to another embodiment of the present invention, the monitoring module 220 is further configured to retrieve information from social media presence of competing, complementary, and partner businesses.

The monitoring module 220 may be configured to operate with other modules, internal or external to the data mining client 208, for collecting data regarding the social media users. For example, the monitoring module 220 may be configured to operate with a third party aggregator system (not shown in the figure) connected to the network 212.

Furthermore, the event selection system 214 in the data mining client 208 may be used to at least partially analyze the collected social media user's data. For example, the event selection system 214 may include a data analysis engine (not shown in the figure) to identify irrelevant social media user data, to rank the information according to a relevance to a particular criterion, or to classify information according to subject, topic, product, and/or any other classification scheme. The event selection system 214 may also be configured to store criteria for selecting and analyzing social media events in rules database 216.

The profile module 222 is configured to build a social media user profile for each user based upon monitored activities of the social media users. The profile may be based upon social media usage by the social media user. The profile module 222 may be configured to build social media user profiles that may include self-description, social circles, posts, likes, locations. According to an embodiment of the present invention, the social media data may be retrieved by the monitoring module 220 periodically at configurable intervals.

In another embodiment of the present invention, the profile module 222 may be configured to update the social media user profiles of each user based on the mined social media user related data. Further, the profile module 222 is configured to prepare an activity repository based on the mined social media user related data. In an embodiment, the profile module 222 is configured to incorporate the retrieved social media content into an extended attribute sets. The attribute sets of the social media user may include social interests, education and work histories, hobbies, hometowns, favorite sport teams and TV shows, cultural background, and so on. The social media user's posting history may reveal a lot about the social media user's interests related to the business. The social media user interest set is updated that may include the results obtained by the monitoring module 220. The profile of the social media user maintained by the data mining client 208 may be updated automatically at configurable intervals after social media user data from the mining process is available.

The attribute set refers to the set of social media user data that may be used to compute user migration pattern across monitored pages. The social media user data may include biographical social media user data, demographic social media user data, and external or internal behavioral social media user data, to name a few. The behavioral social media user data may include the social media user's history with respect to the social media channel. However, the social media user data is not limited in this regard and may include any other type of social media user data used to compute user migration pattern across the monitored pages.

The computing module 224 is further configured to maintain a list of entries, wherein each entry represents an abstract representation of an activity or interaction of a social media user on a monitored page at the configured time interval. Further, the computing module 224 is configured to analyze the activity repository. In an embodiment of the present invention, the computing module 224 is configured to analyze the activity repository of social media users.

For example, consider a company 'A' and a set of businesses that compete to varying degrees with the company 'A' and with each other. This set is analogous to a map of countries with country 'A' in the center, surrounded by other countries representing the competing businesses, which in turn may have other adjacent countries. A system user may want to discover a migration pattern of an overall population of all the countries. In particular, the system user may want to know who and how many people migrate away from country 'A', how often and for how long, which directly neighboring countries and indirectly adjacent countries they preferably migrate to, what they do in these countries and for how long, who returns to 'A' and when, which neighboring countries have strong affinities, i.e., reciprocal migration streams (roughly equally strong in both directions), which pairs of countries have very lopsided migration streams (strong in one direction but weak in the other), etc.

Furthermore, the computing module 224 is configured to compute user migration patterns based on the social media user profiles. The migration patterns may be used by the new, social contact center for the purpose of sales, marketing, or representing a business on the social network sites. In another embodiment of the present invention, the computing module 224 is configured to compute following artifacts:

First, a 'user migration matrix' of size N×N, where N is a number of pages in the Page mix. Each entry $m_{ij}$ represents the number of transitions from page i to page j in the mix. A transition occurs when a social media user shows first activity on page i and then on page j.

Second, for each page 'i', the computing module 224 is configured to compute an outflow metric as $$\sum_{j \neq i} m_{ij}.$$

The computed outflow metric from page i indicates social media users' migration away from page i.

Third, for each page 'i', the computing module 224 is configured to compute an inflow metric as $$\sum_{j \neq i} m_{ji}.$$

The inflow for page i indicates social media users' migration towards page i.

Fourth, for each page 'i', the computing module 224 is configured to compute a stay metric may be represented as $m_{ii}$, thus indicating the retention of social media users on page i and repeat of social media user activity on page i.

Fifth, for each page 'i', the computing module 224 is further configured to compute the differential ratio (outflow-inflow)/stay, which indicates strength of social media users migration away from or towards page i, relative to the activities of loyal social media users (loyal as in not migrating away or towards page i).

Sixth, for each page 'i', the computing module 224 is configured to compute a page adherence metric, which measures an average continuous number of activities per social media user on this page (without transitioning away from the page to others in the mix). The page adherence may be used as an indicator of loyalty of social media users to a given page. The page adherence metric may further include temporal considerations that are not necessarily used to compute the stay metric.

Furthermore, the computing module 224 is configured to compute temporal migration metrics that indicate, for example, how bursty or how continuous that the migration patterns are. Bursty migration patterns may be correlated with events, such as events inside a company, in the business sector, or the wider world, in order to explain sudden changes in migration patterns. Ultimately, a business conducting this type of analysis may gain valuable insights into the behavior of social media users with respect to its own social media presence and the social media presence of its competition. Such insights may prompt the business to change its marketing practices, business processes, and product and service offerings.

Each entry in the activity list includes a sequence $a_1, \ldots, a_n$ of representations of all activities of a given social media user on the pages in the mix and of interactions that this social media user has with the page owner (the business) and other social media users on the page. Each $a_i$ may be represented in vector or tuple form as [i, type, time, content], and may contain the following field information:

"i" is the index of the page on which this activity occurred;

"type" includes an activity type, e.g., a social media user post, a social media user comment, a social media user tag, a social media user like, a business response, a social media user response, a business like, a social media user like, and so forth;

"time" includes the time when the activity occurred; and

"content" includes the textual content of the activity, if there exists associated textual content—e.g., the text of a post or comment.

Further, in yet another embodiment of the present invention, the event selection system 214 in the data mining client 208 includes a query module 226. The query module 226 is configured to receive a query from a system user and provide desired information corresponding to the query to the system user. The query module 226 may utilize the social media user profiles to retrieve information corresponding to the query. For example, the system user may utilize the query module 226 to determine migration patterns of all female, Spanish-speaking customers.

In an embodiment of the present invention, the query module 226 is configured to provide a query interface that allows advanced customized queries supported by the aforementioned artifacts, including:

(a) For a given i and j, show $m_{ij}$;

(b) For given i, display the outflow, inflow, stay, differential ratio, or page adherence metrics; and (c) Custom queries such as:

(1) Compute an average number of social media user activities on page i for all social media users who received a business response to a post within twenty minutes, and who eventually migrated to a different page afterwards;

(2) Compute the total number of social media users who returned to page i from pages j, k, and l within two days of defecting to these pages; and (3) Compute an average number of social media user activities on all pages j≠i for those social media users to defected from page i after not having received a business or social media user response on page i.

Further, the computing module 224 is configured to compute temporal proximity between events. In an embodiment of the present invention, temporal proximity between events may indicate greater or lesser perceived importance, relevance, relatedness, correlation, or the like, to a social media user. For example, if two pages are viewed in a quick succession, it may be surmised or inferred that the first page was quickly determined by the social media user to be not relevant. However, as the social media user lingers more on the first page before viewing the second page, it may be surmised or inferred that the social media user was studying the first page and therefore, it may be more relevant for the social media user. Up to a point, relevancy may be qualitatively judged by how long a social media user stays on the first page. However, after a predetermined time, the relevancy may become less correlated with the social media users' time spent on the page. For example, a social media user spending a very long time on a page before viewing another page may have left the terminal unattended, may have turned their attention to other applications running on the terminal, may have found the information they sought and had no other task to perform, and so forth.

Further, the computing module 224 is configured to analyze temporal information of the social media user. In an embodiment of the present invention, the temporal information may include time taken by a social media user to linger on a page, or how frequently the social media user later interacts with the page (e.g., every few minutes or once a month). The analysis may be further extended to determine metrics as requested by analyst system user, such as, whether and how the social media user interacts with the page owner. For example, if a social media user posted something on a company's Facebook page, and the company did not respond to the social media user within a reasonable amount of time, it may be valuable to know how the lack of a response may have affected the social media users' later web activities regarding the company and the company's competitors. Furthermore, the computing module 224 is configured to facilitate analysis in order to characterize the groups and their members. In an embodiment of the present invention, the computing module 224 is configured to facilitate analysis in order to characterize the groups and their members based on communication flow, for example:

(1) Coherence between members;

(2) Identification of posters who are catalysts for activity (e.g., posters whose activities result in rapid interactions among other social media users, posters whose activities result in a large number of different commentators, posters whose activities result in an interaction to stop (e.g., by solving a problem), etc.); and (3) Rankings of the posts in various dimensions such as topics related to migration and loyalty, interestingness, expressiveness, etc.

Coherence may refer to a similarity between two or more social media users in their track able interactions between a set of social media channels (e.g., Facebook, etc.). Embodiments in accordance with the present invention may provide ability to weight the social network of which people who engage in the most interaction, etc., which may in turn facilitate an ability to group the groups. Such ability may be useful to predict the behavior of one social media user from the activity of a similar social media user.

In another embodiment of the present invention, the computing module 224 is configured to generate different views of migration patterns for different users. The users may include an enterprise, consumers, and members/non-members of the social media channels. Such ability may be useful for an enterprise to determine how often the social media users migrate from the company pages to the competitors' pages and to take corrective actions, for example, the company may provide new sticky contents to the social media users to return to their social media pages, or to hold the attention of the social media users and get them to spend longer period of time on their social media pages. Further, the migration patterns may provide an opportunity to the enterprise to take actions to increase sales, marketing, or to represent business on the social media channels.

The display module 228 is configured to display the analysis on the system user terminal 210. In an embodiment of the present invention, the display module 228 is configured to display the user migration patterns from the computation analysis on the system user terminal 210 for the system user. The computation analysis may be displayed in the form of interactive graphs, cover graphs, and/or real time graphs. Further, the display module 228 is configured to display visualization of the social media user activities. In an embodiment of the present invention, the social media user activities may be visualized as a three dimensional visualization, multimedia visualization, or an audio visualization.

The reporting module 218 is configured to produce a report that is accessible to a system user via system user terminal 210. In an embodiment of the present invention, the report may provide results based on the query of the system user. In another embodiment of the present invention, the reporting module 218 is configured to generate an alert when certain social media user activities exceed a threshold or large user migration patterns are observed. The companies/enterprises may register for subscription service for receiving such alerts so that they are aware that there is a mass exodus from one company to another company. Further, the report may include identification of actionable events to be sent to subscribing companies.

Figure 3:
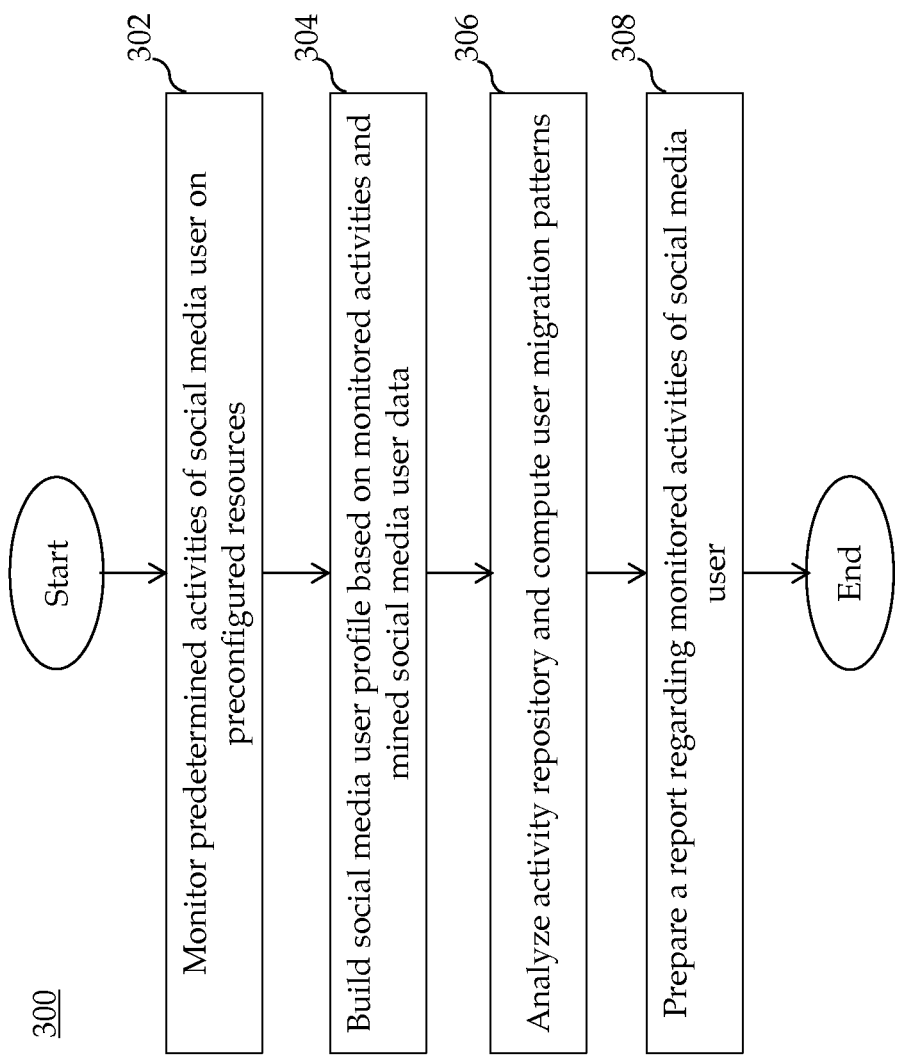
FIG. 3 illustrates a flowchart depicting an embodiment of the present invention.

FIG. 3 illustrates a method 300 for detecting and analyzing user migration patterns on social networking sites.

At step 302, predetermined activities of social media user are monitored on social networking sites. In an embodiment of the present invention, an event selection system 214 continuously monitors predetermined activities that a social media user conducts while visiting a social networking site, in particular one or more predetermined business page of a company or personal Facebook pages. In another embodiment of the present invention, the predetermined activities may include posting of messages (i.e., posts), comments (e.g., responses to other posts), likes or dislikes, posting or viewing of photos, tags (i.e., identification of a person in a photo), and substantially any other publicly visible user and/or page-owner expressions.

In yet another embodiment of the present invention, the event selection system 214 monitors social media users' behavior across different pages of the social networking site (e.g., Facebook pages), with pages to monitor being identified in advance to monitor temporal closeness. Further, the event selection system 214 records all the monitored activities of the social media user and adds them to a repository of activities that may be searched by either a page ID or activity owner ID.

Further, the social media user related data is mined from the social media channels. In an embodiment of the present invention, the event selection system 214 mine social media user related data from the social media channels, or social media for user posts. In another embodiment of the present invention, the social media user data includes posts, comments, likes or dislikes, photos, and tags.

At step 304, social media user profile is built based on monitored activities of the social media user and mined user related data. In an embodiment of the present invention, the event selection system 214 may build a social media user profile based on the user related data available on Facebook pages. The social media user profile may be based on social media user related data about the user, and may include social media user's self description i.e., name, gender, age etc. In another embodiment of the present invention, the social media user's profile may incorporate the retrieved social media content into extended attribute sets. The extended attribute sets of the social media user may include social interests, education and work histories, hobbies, hometowns, favorite sport teams and TV shows, cultural background, and so on. The social media user's posting history may reveal a lot about the social media user's interests related to the business.

In yet another embodiment of the present invention, the social media user related data is periodically retrieved, maintained and updated at configurable time intervals after social media user data from the mining process is available.

At step 306, activity repository of the social media user is analyzed. The event selection system 214 analyzes list of entries (i.e., activity list) of the social media user. The activity list represents all the activities and interactions of the social media user. In an embodiment of the present invention, the event selection system 214 analyzes the activity list when a query is received from a system user of a company to know about user migration patterns on social networking sites. In another embodiment of the present invention, the event selection system 214 analyzes the activity list of the social media user on one of the monitored pages in a Page mix during a configured time interval.

In another embodiment of the present invention, the event selection system 214 computes artifacts such as, user migration patterns. In an embodiment of the present invention, the event selection system 214 computes user migration patterns of social media user across social network sites that are of concern to the new, social contact center for the purpose of sales, marketing, or representing a business on the social network sites.

In yet another embodiment of the present invention, the event selection system 214 computes temporal migration metrics. The temporal migration metrics may indicate, for example, how 'bursty' or how continuous that the migration patterns are. Bursty migration patterns may be correlated with events, such as events inside a company, in the business sector, or the wider world, in order to explain sudden changes in migration patterns.

Further, in an embodiment of the present invention, the event selection system 214 facilitates analysis in order to characterize the groups and their members. In another embodiment of the present invention, the event selection system 214 facilitates the analysis in order to characterize the groups and their members based on communication flow, for example, coherence between members, identification of posters, and ranking of the posts such as, topics related to migration and loyalty, interestingness, expressiveness, etc. In another embodiment of the present invention, the event selection system 214 displays the computation analysis on the system user terminal for the system user as cover graphs, interactive graphs, or real time graphs. In yet another embodiment of the present invention, the social media user activities are visualized by the system user.

At step 308, a report is produced based on the monitored activities of the social media user. In an embodiment of the present invention, the monitored activity may include user migration patterns based on the social media user profiles of users on a social networking site. In another embodiment of the present invention, the event selection system 214 reports the identified and generated events of the social media user to the customer contact center as an actionable event to indicate that there is a mass exodus from the company pages to competitors' pages. In yet another embodiment of the present invention, the produced report is accessible to the system user via system user terminal 210. Further, in an embodiment of the present invention, an alert is generated when certain social media users' activities exceed a threshold or large user migration patterns are observed. Further, the alert may be provided to subscribing companies.

Figure 4:
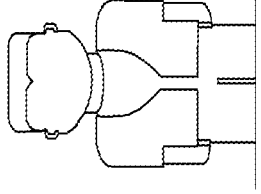
FIG. 4 illustrates an exemplary social media user's profile page on a social network website.

FIG. 4 illustrates social media user's profile page on an exemplary social network site. As shown in FIG. 4, the profile page 400 of the social media user on the social network site may provide information to a data mining client 208 to retrieve information to facilitate detection and analysis of user migration patterns. According to an embodiment of the present invention, the profile page 400 of the social media user on the social network site may include social media users' name, gender, work and home location, language, Facebook friends, education level, work history, favorite TV shows, books, or music. However, the various embodiments are not limited in this regard and other types of social media user data may also be provided without limitation.

The profile page 400 of the social media user on the social network site may also include additional information elements. For example, as shown in FIG. 4, the additional information elements may include additional characteristics of the social media user, such as personal facts, schooling, hobbies, and beliefs, to name a few. As a result, this information may help the data mining client 208 to build activity set to analyze user migration patterns.

Figure 5:
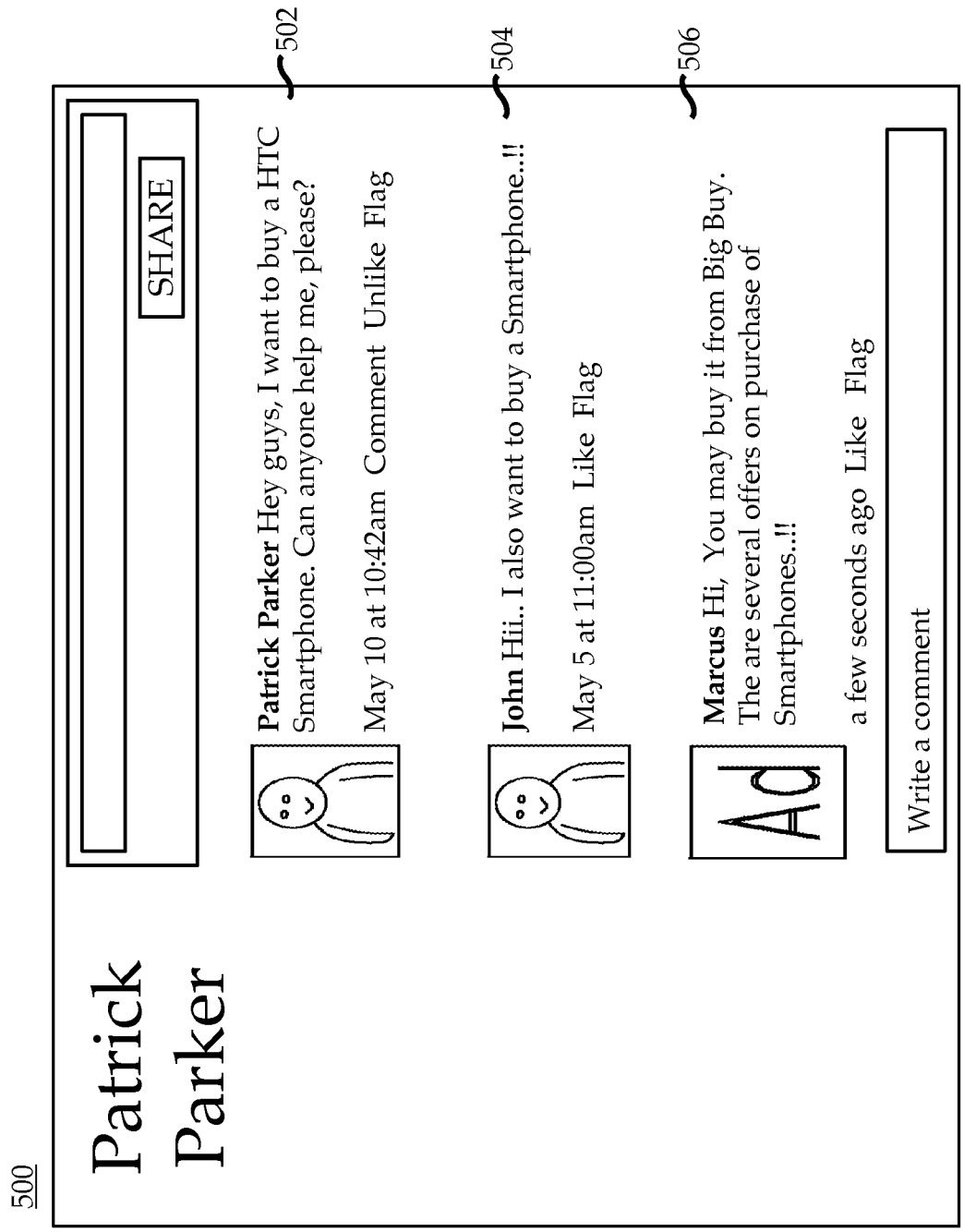
FIG. 5 illustrates an exemplary social media user's comments on a business post on a social network website.

FIG. 5 illustrates social media user's comment on a post on a social network site. The social media user may have commented on business posts 502 and 504 on a business Facebook page on the social network site. The data mining client 208 may retrieve the post of the social media user 506 and considered it as a social media user data to characterize social media user's interest on a particular topic. The data mining client 208 may use this data to build social media user profile having activity set along with the information about the social media users' hobbies, interest, histories etc.

An event selection system embodying the present invention may be hosted on substantially any sufficiently robust computing platform (i.e., a system server) having an Internet access. In particular, the system server does not need to be a web server hosting any of the monitored pages. However, the system server should have access to, and be able to invoke and/or interpret, application programming interface (API) middleware that may be made available to external developers by social networking sites such as Facebook. The system server of embodiments in accordance with the present invention performs an ongoing data mining functions using the API middleware. The API middleware offers an interface by which a system user can track activities of social media users on each monitored page. For example, a Facebook API may provide information on real-time observable activities such as who posts what on a vendor's Facebook page, who comments on the vendor's Facebook page, who tagged it, who likes (or dislikes) that page, and so on. Certain simple activities by a social media user, such as simply viewing a social media channel, do not currently provide an observable event that is reported by the API middleware.

In an embodiment of the present invention, the event selection system may provide an ability to track a social media user who jumps back and forth between different social networking platforms, each of which may have their own customized API middleware interface. The tracking may be accomplished by way of an ID, which may be system assigned or derived from a characteristic such as an IP address. The set of observable activities would vary from one social networking platform to another and may include activities like following, becoming a fan, posting a tweet, interacting on a business social media channel, and so forth.

In another embodiment of the present invention, the event selection system may be incorporated with and/or tied to a web server of an organization deploying the embodiment. For example, suppose a company 'A' desires to monitor the behavior of social media users to their Facebook page as well as to the Facebook pages of their competitors 'B' and 'C', as described above. Embodiments may be co-located or co-hosted on the web server of company 'A'. Observation of track able activity related to competitors 'B' and 'C' would still occur by use of the API middleware. However, co-location in this way allows for tighter integration with company 'A', and possibly being able to analytically data mine additional information related to company 'A' that is not available through API middleware, such as the social media users' interaction with a public web site of company 'A' (not limited to just a Facebook page).

The exemplary systems and methods of this present invention have been described in relation to a user device (e.g. smart device). However, to avoid unnecessarily obscuring the present invention, the preceding description omits a number of known structures and devices. This omission is not to be construed as a limitation of the scope of the present invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An event selection system for computing user migration patterns across social network pages, the event selection system comprising:
    a memory device, the memory device storing executable instructions;
    a processor in communication with the memory device, wherein the processor when executing the executable instructions:
        monitors predetermined activities of a plurality of social media users while visiting a predetermined set of webpages comprising a plurality of webpages within a social networking site;
        builds a social media user profile for each user based on the monitored activities of the social media users;
        based on the social media user profiles, computes user migration patterns across two or more webpages of the predetermined set of webpages; and
        drives a display of the user migration patterns on a system user terminal.

2. The event selection system of claim 1, wherein the processor when executing the executable instructions:
    records the predetermined activities of the social media users in a repository.

3. The event selection system of claim 1, wherein the predetermined activities comprise one or more of posts, comments, likes or dislikes, posting or viewing of photos, tags, publicly visible user expressions, or page-owner expressions.

4. The event selection system of claim 1, wherein the predetermined set of webpages comprises webpages of business competitors on the social networking site.

5. The event selection system of claim 1, wherein the processor when executing the executable instructions:
    utilizes social media observable events; and
    mines social media user related data from the predetermined set of webpages within the social networking site.

6. The event selection system of claim 5, wherein the processor when executing the executable instructions:
    updates the social media user profile of each user based on the mined social media user related data.

7. The event selection system of claim 5, wherein the processor when executing the executable instructions:
    prepares an activity repository based on the mined social media user related data.

8. The event selection system of claim 7, wherein processor when executing the executable instructions:
    analyzes the activity repository of the plurality of social media users while visiting the predetermined set of webpages within the social networking site.

9. The event selection system of claim 8, wherein processor when executing the executable instructions:
    computes temporal migration metrics indicating a continuity of the user migration patterns.

10. The event selection system of claim 5, wherein the processor when executing the executable instructions:
    prepares an extended attributes set based on the mined social media user related data.

11. The event selection system of claim 10, wherein the extended attributes set comprises one or more of the social media users' interests, education and work histories, hobbies, locations, hometowns, favorite sport teams and TV shows, or cultural background.

12. The event selection system of claim 1, wherein the processor when executing the executable instructions:
    maintains a list of entries, wherein each entry represents an abstract representation of an activity or interaction of a particular social media user on a monitored webpage during a configured time interval, wherein the monitored webpage comprises one of the predetermined set of webpages within a social networking site.

13. The event selection system of claim 1, wherein the processor when executing the executable instructions:
receives a query from a system user.

14. The event selection system of claim 13, wherein the processor when executing the executable instructions:
utilizes the social media user profiles to retrieve information corresponding to the query received from the system user.

15. The event selection system of claim 13, wherein the processor when executing the executable instructions:
produces a report that indicates desired information based on the query received from the system user.

16. A computer-implemented method for computing user migration pattern on pages of a social network, the computer-implemented method comprising:
monitoring, by a processor, predetermined activities of a plurality of social media users while visiting a predetermined set of webpages comprising a plurality of webpages within a social networking site;
building, by the processor, a social media user profile for each user based on the monitored activities of the social media users;
based on the social media user profiles, analyzing and computing, by the processor, migration patterns of social media users across two or more webpages of the predetermined set of webpages; and
reporting, by the processor, monitored activities of the plurality of social media users to a system user.

17. A computer-implemented method of claim 16, wherein the predetermined activities comprise one or more of posts, comments, likes or dislikes, posting or viewing of photos, tags, publicly visible user expressions, or page-owner expressions.

18. A computer-implemented method of claim 16, further comprising receiving, by the processor, a query and utilizing the social media user profiles to retrieve information corresponding to the query.

19. A computer program product for computing user migration patterns across social network pages, the computer program product comprising:
a non-transitory computer readable storage medium having computer readable code embodied therewith, the computer readable program code comprising:
computer readable program code configured to monitor predetermined activities of a plurality of social media users while visiting a predetermined set of webpages comprising a plurality of webpages within a social networking site;
computer readable program code configured to build a social media user profile based on the monitored activities of the social media users;
computer readable program code configured to analyze and compute, based on the social media user profiles, migration patterns of social media users across two or more webpages of the predetermined set of webpages; and
computer readable program code configured to report monitored activities of the plurality of social media user to a system user.

\* \* \* \* \*